United States Patent
Won et al.

(10) Patent No.: US 7,708,969 B2
(45) Date of Patent: May 4, 2010

(54) METHOD OF FORMING METAL OXIDE

(75) Inventors: Seok-Jun Won, Seoul (KR); Yong-Min Yoo, Daejeon (KR); Min-Woo Song, Suwon-si (KR); Dae-Youn Kim, Daejeon (KR); Young-Hoon Kim, Daejeon (KR); Weon-Hong Kim, Suwon-si (KR); Jung-Min Park, Ansan-si (KR); Sun-Mi Song, Daejeon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 11/775,111

(22) Filed: Jul. 9, 2007

(65) Prior Publication Data

US 2008/0056975 A1 Mar. 6, 2008

(30) Foreign Application Priority Data

Jul. 10, 2006 (KR) ...................... 10-2006-0064250

(51) Int. Cl.
*C01F 17/00* (2006.01)
*C25D 17/00* (2006.01)

(52) U.S. Cl. .................... 423/263; 204/194; 423/592.1; 423/594.17; 423/608; 423/620; 423/636

(58) Field of Classification Search ................. 423/263, 423/592.1, 608, 610, 611, 612, 613, 618, 423/619, 624, 625, 635, 636, 594.17; 204/157.15, 204/157.4, 157.5, 157.51; 427/248.1, 255.11, 427/255.15, 255.19, 255.5, 255.7, 402, 419.1, 427/419.2, 419.3, 421.1, 424, 425, 426, 427, 427/446, 453, 454, 457, 585, 595
See application file for complete search history.

(56) References Cited

U.S. PATENT DOCUMENTS

| 6,634,314 | B2 * | 10/2003 | Hwang et al. ........... 118/723 R |
| 6,998,014 | B2 * | 2/2006 | Chen et al. ............. 156/345.34 |
| 7,081,421 | B2 * | 7/2006 | Ahn et al. ................... 438/785 |
| 7,481,882 | B2 * | 1/2009 | Won et al. ...................... 117/97 |
| 2003/0172872 | A1 * | 9/2003 | Thakur et al. ............... 118/715 |

(Continued)

FOREIGN PATENT DOCUMENTS

JP 2005-347447 12/2005

(Continued)

OTHER PUBLICATIONS

English Abstract for Publication No. 1020020095342.

(Continued)

*Primary Examiner*—Timothy C Vanoy
*Assistant Examiner*—Richard M Rump
(74) *Attorney, Agent, or Firm*—F. Chau & Associates, LLC (57) ABSTRACT

In a method and an apparatus for forming metal oxide on a substrate, a source gas including metal precursor flows along a surface of the substrate to form a metal precursor layer on the substrate. An oxidizing gas including ozone flows along a surface of the metal precursor layer to oxidize the metal precursor layer so that the metal oxide is formed on the substrate. A radio frequency power is applied to the oxidizing gas flowing along the surface of the metal precursor layer to accelerate a reaction between the metal precursor layer and the oxidizing gas. Acceleration of the oxidation reaction may improve electrical characteristics and uniformity of the metal oxide.

10 Claims, 7 Drawing Sheets

U.S. PATENT DOCUMENTS

2005/0260348 A1* 11/2005 Lee et al. ............... 427/255.23
2007/0237699 A1* 10/2007 Clark ......................... 423/263

FOREIGN PATENT DOCUMENTS

| KR | 1020020095342 | 12/2002 |
| KR | 1020030003320 | 1/2003 |
| KR | 1020050088729 | 9/2007 |

OTHER PUBLICATIONS

English Abstract for Publication No. 1020030003320.
English Abstract for Publication No. 1020050088729.
English Abstract for Publication No. 2005-347447.

* cited by examiner

METHOD OF FORMING METAL OXIDE

CROSS-REFERENCE TO RELATED APPLICATIONS

This application claims priority under 35 USC § 119 to Korean Patent Application No. 2006-64250 filed on Jul. 10, 2006, the contents of which are herein incorporated by reference in their entirety.

BACKGROUND OF THE INVENTION

1. Field of the Invention

The present disclosure is directed to a method of forming metal oxide and an apparatus for performing the same. More particularly, the present disclosure is directed to a method of forming metal oxide on a semiconductor substrate such as a silicon wafer using a plasma-enhanced atomic layer deposition (PEALD) and an apparatus for performing the method.

2. Description of the Related Art

Semiconductor memory devices have been more highly integrated and operated at higher speeds by significantly reducing the size of memory cells in the devices. A reduced memory cell size has correspondingly decreased the area available for forming transistors and capacitors. Accordingly lengths of transistor gate electrodes have been decreased.

Decreased length of the transistor gate electrode causes a corresponding decrease in a thickness of a gate insulating layer beneath the gate electrode. When the gate insulating layer is formed from silicon oxide ($SiO_2$) and has a thickness of less than about 20 Å, the operation of the transistor may be degraded by an increase in leakage current due to electron tunneling, infiltration of impurities in the gate electrode, and/or decrease in threshold voltage.

Capacitor capacitance in the memory cell decreases as the memory cell decreases in size. Reduction of the cell capacitance may cause the operation of the memory cell to be degraded by deterioration of data readability in the memory cell and/or increase in a soft error rate. As a result, the memory device may not properly operate at a relatively low voltage due to the reduction in the cell capacitance.

To improve the cell capacitance of the semiconductor memory device having a small cell region, it is known to form a dielectric layer having a very thin thickness. It is also known to form a lower electrode having a cylindrical shape or a fin shape so as to increase an effective area of the capacitors. In a dynamic random access memory (DRAM) device having a storage capacity of more than about 1 gigabyte: however, the above-mentioned approaches cannot be employed for manufacturing the DRAM device because these approaches do not enable a sufficiently high cell capacitance for the DRAM device to be obtained.

To address the above-mentioned challenges, it is known to form a dielectric layer using metal oxide having a high dielectric constant that is greater than that of silicon nitride. The metal oxide may be formed by an atomic layer deposition (ALD), a PEALD, and the like.

Particularly, metal oxide may be formed on a semiconductor substrate by a lateral flow type PEALD process. The metal oxide formed by the lateral flow type PEALD process may have improved electrical characteristics in general.

However, in the case where cylindrical lower electrodes having a high aspect ratio are formed on a semiconductor substrate and a metal oxide layer is then formed on the cylindrical lower electrodes by the lateral flow type PEALD process, the metal oxide layer may have poorer electrical characteristics in comparison with a metal oxide layer formed by a conventional ALD process.

SUMMARY OF THE INVENTION

Exemplary embodiments of the present invention provide methods of forming metal oxide having improved electrical characteristics.

Exemplary embodiments of the present invention also provide apparatuses for forming metal oxide having improved electrical characteristics.

In accordance with an aspect of the present invention, a source gas including metal precursor may be supplied onto a substrate to allow the source gas to flow along a surface of the substrate so that a metal precursor layer is formed on the substrate. An oxidizing gas including ozone may be supplied onto the metal precursor layer to allow the oxidizing gas to flow along a surface of the metal precursor layer so that the metal precursor layer may be oxidized. Metal oxide may be formed on the substrate. A radio frequency (RF) power may be applied to the oxidizing gas flowing along the surface of the metal precursor layer, so that an oxidation reaction between the metal precursor layer and the oxidizing gas may be accelerated.

In some exemplary embodiments of the present invention, examples of metal that may be used for the metal precursor may include zirconium (Zr), hafnium (Hf), aluminum (Al), tantalum (Ta), titanium (Ti), lanthanum (La), strontium (Sr), barium (Ba), praseodymium (Pr), lead (Pb), etc. These can be used alone or in a combination thereof.

In some exemplary embodiments of the present invention, a concentration of the ozone in the oxidizing gas may be in a range of about 100 $g/m^3$ to about 1000 $g/m^3$. Particularly, a concentration of the ozone in the oxidizing gas may be in a range of about 100 $g/m^3$ to about 500 $g/m^3$. For example, a concentration of the ozone in the oxidizing gas may be about 200 $g/m^3$.

In some exemplary embodiments of the present invention, the supply of the oxidizing gas and the application of the RF power may be performed substantially simultaneously.

In some exemplary embodiments of the present invention, an oxygen gas may be supplied onto the substrate before supplying the oxidizing gas. The oxygen gas may be supplied for about 0.1 to about 3 seconds.

In some exemplary embodiments of the present invention, an interior of a process chamber in which the substrate is placed may be purged by a purge gas after forming the metal precursor layer, and the interior of the process chamber may be purged by a purge gas after forming the metal oxide.

In some exemplary embodiments of the present invention, the source gas and the oxidizing gas may flow from a first edge portion of the substrate towards a second edge portion opposite to the first edge portion of the substrate.

In some exemplary embodiments of the present invention, the interior of the process chamber may be maintained at a pressure in a range of about 0.1 to about 10 Torr, and the substrate may be maintained at a temperature in a range of room temperature to about 450° C.

In some exemplary embodiments of the present invention, after forming the metal oxide, the substrate may be rotated by a predetermined angle and then the supply of the source gas and the oxidizing gas, and the application of the RF power may be repeatedly performed.

In some exemplary embodiments of the present invention, the substrate may be continuously rotated, and the supply of the source gas and the oxidizing gas, and the application of the RF power may be repeatedly performed while rotating the substrate.

In accordance with another aspect of the present invention, an apparatus for forming metal oxide may include a substrate stage, a chamber and a RF power source. The substrate stage may have a support region for supporting a substrate and a peripheral region surrounding the support region. The chamber may be disposed on the peripheral region of the stage to define a space in which the substrate is placed. The space may be defined by the support region of the stage and inner surfaces of the chamber. The chamber may have a gas inlet port for supplying a source gas including metal precursor to allow the source gas to flow along a surface of the substrate so that a metal precursor layer is formed on the substrate. The gas inlet port may also supply an oxidizing gas including ozone to allow the oxidizing gas to flow along a surface of the metal precursor layer so that the metal precursor layer is oxidized. The metal oxide may be formed on the substrate by oxidizing the metal precursor layer. The RF power source may be connected to the chamber for applying a RF power to the oxidizing gas flowing along the surface of the metal precursor layer so that an oxidation reaction between the metal precursor layer and the oxidizing gas may be accelerated.

In some exemplary embodiments of the present invention, the apparatus may further include a first gas supply section connected to the chamber for supplying the source gas onto the substrate and a second gas supply section connected to the chamber for supplying the oxidizing gas onto the metal precursor layer. Example of the second gas supply section may include an ozone generator.

In some exemplary embodiments of the present invention, the apparatus may further include a third gas supply section for supplying a purge gas onto the metal precursor layer and the metal oxide, and a fourth gas supply section for supplying an oxygen gas onto the metal precursor layer before supplying the oxidizing gas.

In some exemplary embodiments of the present invention, the chamber may include a cover disposed on the peripheral region of the stage and a RF electrode connected to the cover to face the substrate supported by the stage. Also, the RF electrode is connected to the RF power source.

In some exemplary embodiments of the present invention, the cover may include a ceiling portion disposed over the stage and a protruding portion extending downwardly from an edge of the ceiling portion and disposed on the peripheral region of the stage. The protruding portion may be ring-shaped, and the RF electrode may be disk-shaped and be disposed on a lower surface of the ceiling portion.

In some exemplary embodiments of the present invention, the gas inlet port may be defined by an inner surface of the protruding portion and an outer surface of the RF electrode. The RF electrode may have channels connected to the gas inlet port for supplying the source gas and the oxidizing gas. Each of the channels may widen towards the outer surface of the radio frequency electrode.

In some exemplary embodiments of the present invention, the chamber may have an outlet port disposed opposite the gas inlet port. An exhauster may be connected to the outlet port for exhausting the source gas, the oxidizing gas and by-products of the oxidation reaction.

In some exemplary embodiments of the present invention, the apparatus may further include a driving section for rotating the stage so as to rotate the substrate supported by the stage.

In accordance with the exemplary embodiments of the present invention, the oxidation reaction between the metal precursor layer formed on the substrate and the oxidizing gas may be accelerated by applying the RE power. The acceleration of the oxidation reaction may improve electrical characteristics and uniformity of the metal oxide on the substrate.

BRIEF DESCRIPTION OF THE DRAWINGS

Exemplary embodiments of the present invention will become readily apparent along with the following detailed description when considered in conjunction with the accompanying drawings.

DETAILED DESCRIPTION OF EXEMPLARY EMBODIMENTS

Embodiments of the invention now will be described more fully hereinafter with reference to the accompanying drawings, in which exemplary embodiments of the invention are shown. This invention may, however, be embodied in many different forms and should not be construed as limited to the embodiments set forth herein. Like reference numerals refer to like elements throughout. It will be understood that when an element is referred to as being "on" another element it can be directly on the other element or intervening elements may be present.

Figure 1:
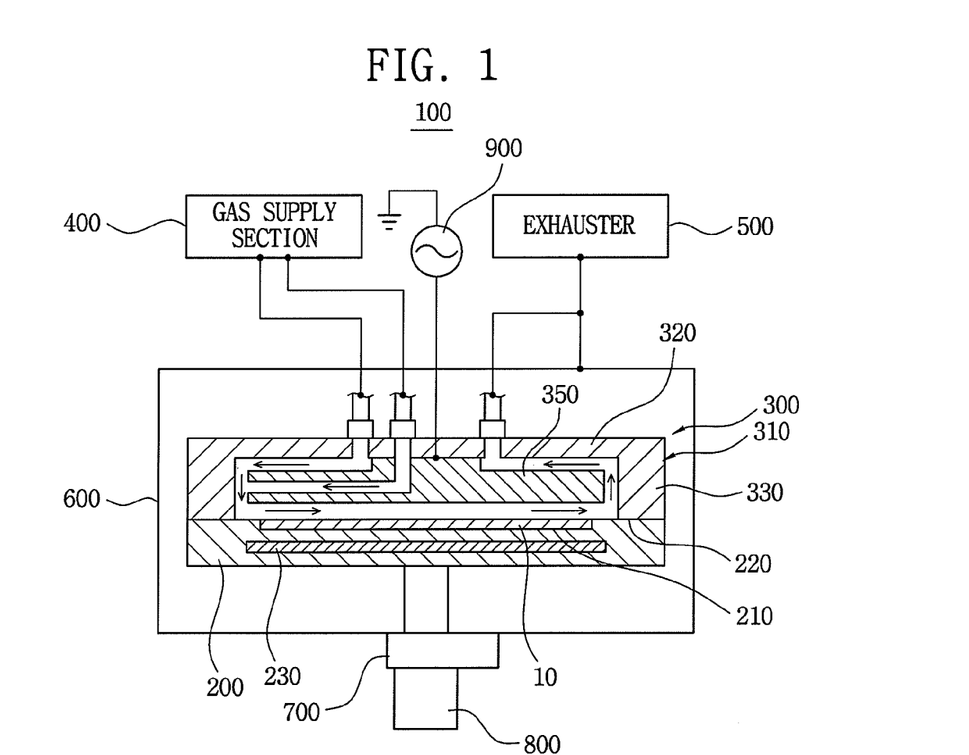
FIG. 1 is a schematic view illustrating an apparatus for forming metal oxide in accordance with an exemplary embodiment of the present invention.

FIG. 1 is a schematic view illustrating an apparatus for forming metal oxide in accordance with an exemplary embodiment of the present invention.

Referring to FIG. 1, an apparatus for forming metal oxide 100 may be used for forming metal oxide having a high dielectric constant on a semiconductor substrate 10 such as a silicon wafer. Particularly, the apparatus may be used for forming metal oxide such as hafnium oxide (HfO), zirconium oxide (ZrO), aluminum oxide (AlO), tantalum oxide (TaO), titanium oxide (TiO), lanthanum oxide (LaO), strontium oxide (SrO), barium oxide (BaO), praseodymium oxide (PrO), lead oxide (PbO), etc, on the semiconductor substrate 10. A layer including the metal oxide may be used as a gate insulating layer of a transistor, a dielectric layer of a capacitor, and the like.

The semiconductor substrate 10 may be supported by a substrate stage 200. The stage 200 may have a support region 210 for supporting the semiconductor substrate 10 and a peripheral region 220 surrounding the support region 210. An upper surface of the peripheral region 220 may be disposed higher than an upper surface of the support region 210. For example, the upper surface of the peripheral region 220 may have a height substantially the same as that of an upper surface of the semiconductor substrate 10 placed on the support region 210.

A heater 230 may be disposed in the stage 200 to heat the semiconductor substrate 10 to a predetermined process temperature. For example, the metal oxide may be formed at a temperature in a range of room temperature to about 450° C. Alternatively, a heating block for heating the semiconductor substrate 10 may be coupled to a lower portion of the stage 200.

A process chamber 300 may be disposed on the peripheral region 220 to define a space in which the semiconductor substrate 10 is placed. The process chamber 300 may include a cover 310 and a RF electrode 350.

The cover 310 may include a ceiling portion 320 and a protruding portion 330. The ceiling portion 320 may be disk-shaped and disposed over the stage 200. The protruding portion 330 may extend downwardly from an edge of the ceiling portion 320 and may have a ring shape. Further, the protruding portion 330 is disposed on the peripheral region 220 of the stage 200. The RF electrode 350 may be disposed on a lower surface of the ceiling portion 320 to face the semiconductor substrate 10 placed on the support region 210 of the stage 200. For example, the RF electrode 350 may be coupled to the lower surface of the ceiling portion 320 by a plurality of fasteners.

Figure 2:
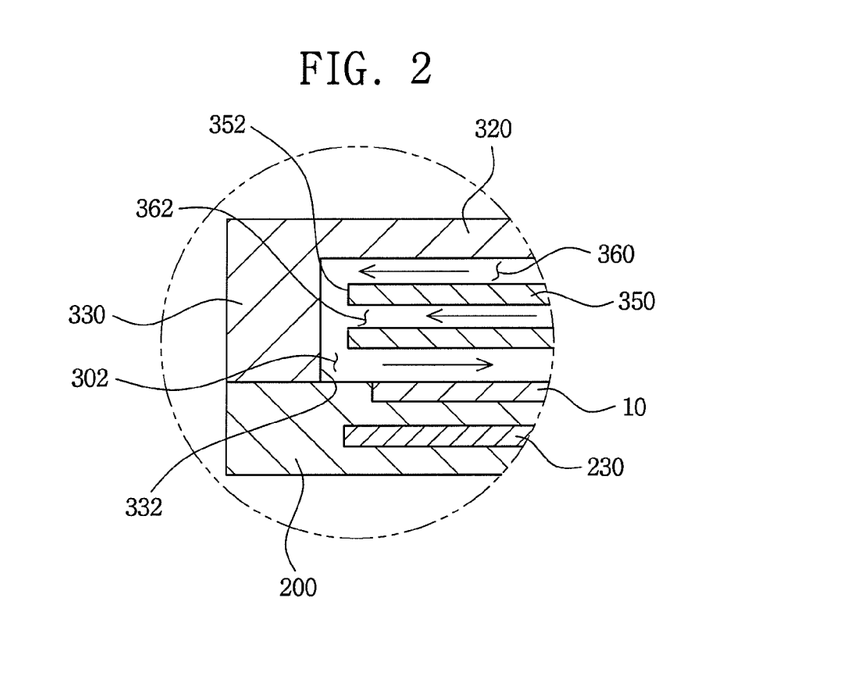
FIG. 2 is an enlarged cross-sectional view illustrating a gas inlet port in FIG. 1.
Figure 3:
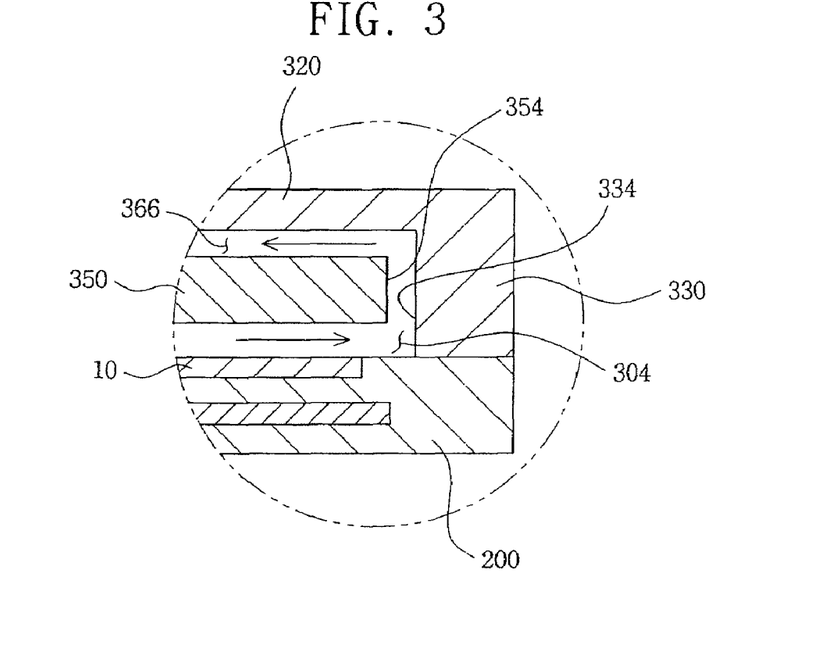
FIG. 3 is an enlarged cross-sectional view illustrating an outlet port in FIG. 1.

FIG. 2 is an enlarged cross-sectional view illustrating a gas inlet port, and FIG. 3 is an enlarged cross-sectional view illustrating an outlet port.

Referring to FIGS. 2 and 3, the process chamber 300 may have a gas inlet port 302, which supplies a source gas including metal precursor and an oxidizing gas including ozone, and an outlet port 304, which exhausts the gases and by-produces of an oxidation reaction using the oxidizing gas.

The gas inlet port 302 may be adjacent to a first edge portion of the semiconductor substrate 10, and the outlet port 304 may be adjacent to a second edge portion opposite to the first edge portion of the semiconductor substrate 10.

The gas inlet port 302 may be defined by a first inner surface 332 of the protruding portion 330 and a first outer surface 352 of the RF electrode 350. The outlet port 304 may be defined by a second inner surface 334 of the protruding portion 330 and a second outer surface 354 of the RF electrode 350. The first and second inner surfaces 332 and 334 of the protruding portion 330 may be disposed to face with each other, and the first and second outer surfaces 352 and 354 may be disposed on opposite sides of the RF electrodes 350.

The source gas may flow along the upper surface of the semiconductor substrate 10 from the gas inlet port 302 towards the outlet port 304. Thus, a metal precursor layer may be formed on the semiconductor substrate 10. The oxidizing gas may flow along an upper surface of the metal precursor layer from the gas inlet port 302 towards the outlet port 304, to thereby oxidize the metal precursor layer. Thus, metal oxide may be formed on the semiconductor substrate 10 by an oxidation reaction between the metal precursor layer and the oxidizing gas, thereby forming a metal oxide layer on the semiconductor substrate 10. That is, the source gas and the oxidizing gas may be supplied from the first edge portion towards the second edge portion of the semiconductor substrate 10.

Referring again to FIG. 1, a gas supply section 400 for supplying the source gas and the oxidizing gas may be connected to the ceiling portion 320 of the process chamber 300 by gas supply pipes. The source gas, the oxidizing gas and by-products formed while forming the metal oxide may be exhausted by an exhauster 500 that is connected to the ceiling port 320 of the process chamber 300 by an exhaust pipe.

Figure 4:
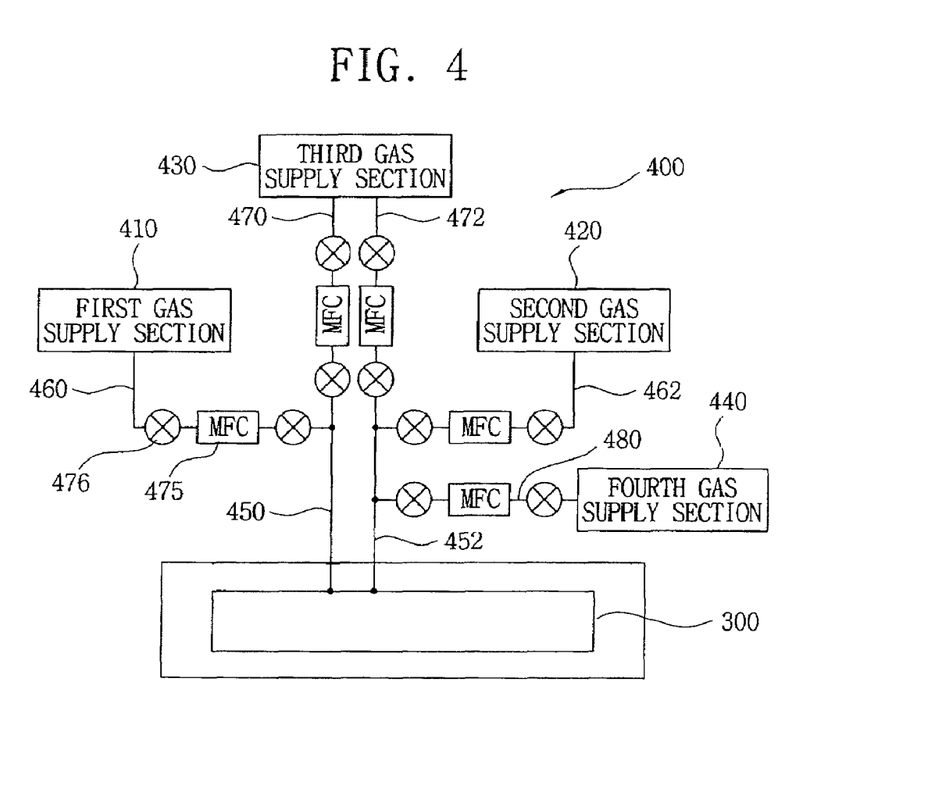
FIG. 4 is a schematic view illustrating a gas supply section in FIG. 1

FIG. 4 is a schematic view illustrating the gas supply section 400.

Referring to FIG. 4, the gas supply section 400 may include a first gas supply section 410 for supplying the source gas and a second gas supply section 420 for supplying the oxidizing gas.

Examples of the first gas supply section 410 may include a liquid delivery system (LDS), a bubbler including a bubbling container, and the like.

Examples of metal that may be used for the source gas may include zirconium (Zr), hafnium (Hf), aluminum (Al), tantalum (Ta), titanium (Ti), lanthanum (La), strontium (Sr), Barium (Ba), praseodymium (Pr), lead (Pb), and the like. These can be used alone or in a combination thereof. The source gas may be supplied along with a carrier gas into the process chamber 300. Example of the carrier gas may include an inert gas such as argon (Ar).

The second gas supply section 420 may include an ozone generator. The ozone generator may generate ozone using an oxygen gas. That is, the oxidizing gas may be a gas mixture of ozone and oxygen, and a concentration of ozone in the oxidizing gas may be in range of about 100 to about 1000 $g/m^3$. Particularly, a concentration of ozone in the oxidizing gas may be in a range of about 100 to about 500 $g/m^3$. For example, a concentration of ozone in the oxidizing gas may be about 200 $g/m^3$.

The gas supply section 400 may further include a third gas supply section 430 for supplying an inert gas used as a purge gas. The inert gas may be used for adjusting an internal pressure of the process chamber 300. For example, an interior of the process chamber 300 may be primarily purged by a purge gas after forming the metal precursor layer and may be secondarily purged by a purge gas after forming the metal oxide. An internal pressure of the process chamber 300 may be maintained at a pressure in a range of about 0.1 to about 10 Torr, and an inert gas may be supplied into the process chamber 300 along with the source and/or the oxidizing gas to adjust the internal pressure of the process chamber 300.

The gas supply section 400 may further include a fourth gas supply section 440 for supplying an oxygen gas into the process chamber 300 after primarily purging the interior of the process chamber. The fourth gas supply section 440 is provided to form an oxygen atmosphere in the process chamber 300 before oxidizing the metal precursor layer using the oxidizing gas. Alternatively, the oxygen gas may be supplied by the second gas supply section 420 instead of the fourth gas supply section 440.

The first, second, third and fourth gas supply sections 410, 420, 430 and 440 may be connected to the process chamber 300 by a plurality of pipes. A first main pipe 450 and a second main pipe 452 may be connected to the process chamber 300. A first divergent pipe 460 may diverge from the first main pipe 450, and the first gas supply section 410 may be connected to the first main pipe 450 by the first divergent pipe 460. A second divergent pipe 462 may diverge from the second main pipe 452, and the second gas supply section 420 may be connected to the second main pipe 452 by the second divergent pipe 462. A third divergent pipe 470 and a fourth divergent pipe 472 may diverge from the first and second main pipes 450 and 452, respectively. The third gas supply section 430 may be connected to the first and second main pipes 450 and 452 by the third and fourth divergent pipes 470 and 472, respectively. A fourth gas supply section 440 may be connected to the second main pipe 452 by a connecting pipe 480.

Mass flow controllers 475 and valves 476 may be disposed in the first, second, third and fourth divergent pipes 460, 462, 470 and 472 and the connecting pipe 480 to adjust flow rates of the source gas, the oxidizing gas, the purge gas, the pressure adjusting gas and the oxygen gas. To avoid unduly cluttering the figure, only those mass flow controllers and valves on first pipe 460 are indicated.

The configuration including the pipes, the mass flow controllers and the valves may be varied. Thus, the spirit and scope of the present invention may be not limited by the connecting relations between the pipes, the mass flow controller and the valves.

Referring again to FIG. 1, the process chamber 300 and the stage 200 may be received in an outer chamber 600. A first driving section 700 for rotating the stage 200 and a second driving section 800 for vertically moving the stage 200 may be disposed beneath the outer chamber 600.

The first driving section 700 may rotate the stage 200 in a stepwise manner. That is, the first driving section 700 may rotate the stage 200 by a predetermined angle to improve thickness uniformity of the metal oxide layer while forming the metal oxide layer. For example, the first driving section 700 may rotate the stage 200 by a predetermined angle, for example, approximately 60°, 90°, 180°, etc, posterior to the formation of the metal precursor layer, the primarily purging step, the oxidation of the metal precursor layer and the secondarily purging step. Then, the steps for forming metal oxide may be repeatedly performed. That is, the steps for forming metal oxide and the rotation of the stage 200 may be repeatedly performed several times, thereby improving thickness uniformity of the metal oxide layer.

In accordance with another example embodiment, the semiconductor substrate 10 may be continuously rotated. The steps for forming the metal oxide may be repeatedly performed while continuously rotating the semiconductor substrate 10.

Further the first driving section 700 may only rotate the support region 210 of the stage 200 while repeatedly performing the steps for forming the metal oxide.

The second driving section 800 may move the stage 200 in a vertical direction to load or unload the semiconductor substrate 10.

Although not shown in figures, a plurality of lift pins may be disposed in the outer chamber 600. Particularly, the lift pins may be movably disposed in the vertical direction through the stage 200 to load or unload the semiconductor substrate 10. A gate valve (not shown) may be disposed in a side wall of the outer chamber 600 to transfer the semiconductor substrate 10.

The exhauster 500 may be connected to the process chamber 300 to exhaust the source gas, the oxidizing gas and the by-products formed while forming the metal oxide.

The exhauster 500 may include a high vacuum pump and a roughing pump, The interior of the process chamber 300 may be maintained at a pressure in a range of about 0.1 to about 10 Torr by the exhauster 500 while forming the metal oxide.

Figure 5:
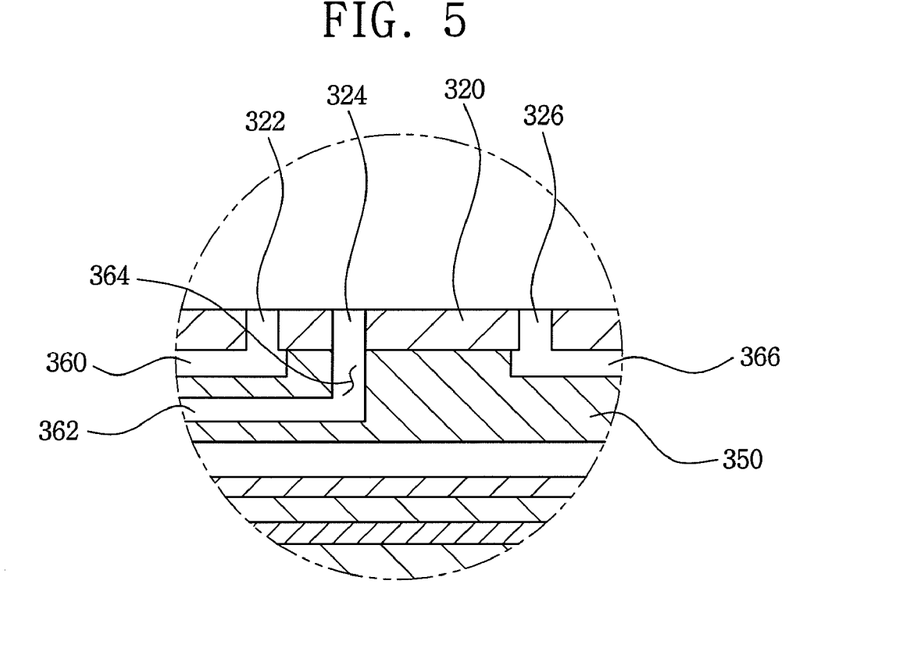
FIG. 5 is an enlarged cross-sectional view illustrating a RF electrode in FIG. 1.
Figure 6:
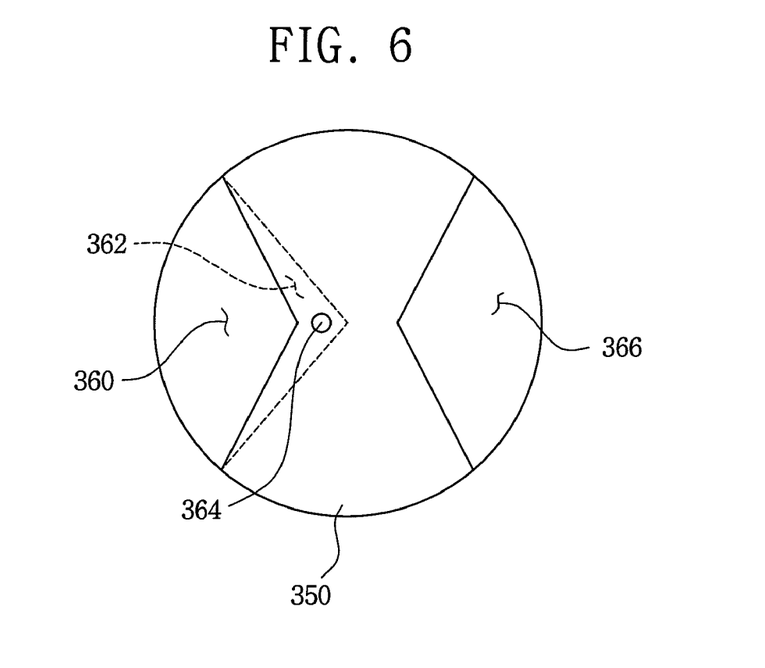
FIG. 6 is a plan view illustrating the RF electrode in FIG. 1.

FIG. 5 is an enlarged cross-sectional view illustrating the RF electrode 350, and FIG. 6 is a plan view illustrating the RF electrode 350.

Referring to FIGS. 2, 3, 5 and 6, the ceiling portion 320 of the cover 310 may have a first connecting port 322 connected to the first main pipe 450 for supplying the source gas, a second connecting port 324 connected to the second main pipe 452 for supplying the oxidizing gas and a third connecting port 326 for communication with the exhauster 500.

A first channel 360 may be provided in an upper surface portion of the RF electrode 350. The first channel 360 may be in communication with the first connecting port 322 and may widen towards the first outer surface 352 of the RF electrode 350. A second channel 362 may be provided under the first channel 360 in the RF electrode 350. The second channel 362 may be in communication with the second connecting port 324 through a fourth connecting port 364 that is formed in the RF electrode 350, and may widen towards the first outer surface 352 of the RF electrode 350. Further, a third channel 366 may be provided in the upper surface portion of the RF electrode 350. The third channel 366 may be in communication with the third connecting port 326 and may widen towards the second outer surface 354 of the RF electrode 350. Each of the first, second and third channels 360, 362 and 366 may be fan-shaped as shown in FIG. 6.

As described above, because the first and second channels 360 and 362 widen towards the first outer surface 352 of the RF electrode 350, the source gas and the oxidizing gas may be uniformly supplied along the surface of the semiconductor substrate 10 and the surface of the metal precursor layer.

Referring again to FIG. 1, the RF electrode 350 may be connected to a RE power source 900 to apply a RE power to the oxidizing gas flowing along the surface of the metal precursor layer. The RF power may be applied to accelerate the oxidation reaction between the metal precursor layer and the oxidizing gas. In case the RF power is applied to the oxidizing gas, the concentration of ozone in the oxidizing gas may be increased, and a concentration of oxygen radical in the oxidizing gas may be also increased. As a result, the oxidation reaction between the metal precursor layer and the oxidizing gas may be accelerated.

Figure 7:
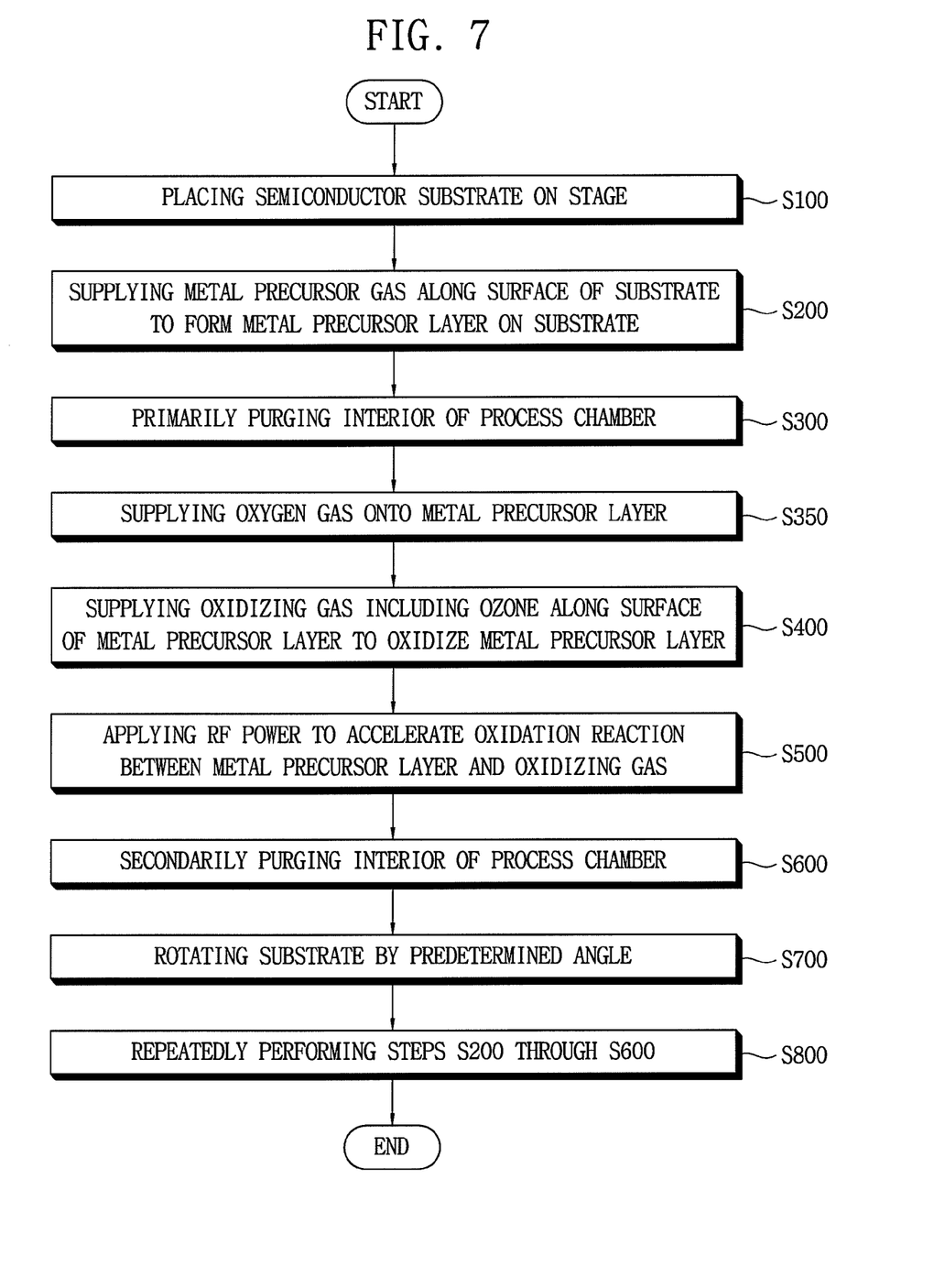
FIG. 7 is a flow chart illustrating a method of forming metal oxide on a substrate using the apparatus in FIG. 1.

FIG. 7 is a flow chart illustrating a method of forming metal oxide on the semiconductor substrate 10 using the apparatus 100 as shown in FIG. 1.

Referring to FIG. 7, in step S100, the semiconductor substrate 10 such as a silicon wafer may be placed on the stage 200. Particularly, the semiconductor substrate 10 may be transferred into an interior of the outer chamber 600 through the gate valve of the outer chamber 600 and may be then loaded on the stage 200 by the lift pins. Then, the second driving section 800 moves the stage 200 upwards so as to place the semiconductor substrate 10 in the process chamber 300.

Patterns having electrical characteristics may be formed on the semiconductor substrate 10. For example, active patterns that are electrically isolated by the field oxide layer may be formed on the surface of the semiconductor substrate 10. Further, the semiconductor substrate 10 may have conductive structures that serve as lower electrodes of capacitors and have a cylindrical shape.

In step S200: a source gas including metal precursor may be supplied into the process chamber 300 to form a metal precursor layer on the semiconductor substrate 10. Here, the source gas may be supplied to flow along the surface of the semiconductor substrate 10 from the first gas supply section

410 through the first channel 360 and the gas inlet port 302. Examples of metal that may be used for the metal precursor may include zirconium (Zr), hafnium (Hf), aluminum (Al), tantalum (Ta), titanium (Ti), lanthanum (La), strontium (Sr), Barium (Ba), praseodymium (Pr), lead (Pb), and the like. Examples of a source gas including zirconium (Zr) may include tetrakis ethyl methyl amino zirconium (TEMAZ; $Zr[N(CH_3)(C_2H_5)]_4$), zirconium tert-butoxide ($Zr[OC(CH_3)_3]_4$), which may also be referred to as $Zr(O^tBu)_4$ or zirconium butyl oxide, and the like. These may be used alone or in a combination thereof. Examples of a source gas including hafnium (Hf) may include tetrakis dimethyl amino hafnium (TDMAH; $Hf[N(CH3)2]4$) tetrakis ethyl methyl amino hafnium (TEMAH; $Hf[N(C2H5)CH3]4$), tetrakis diethyl amino hafnium (TDEAH; $Hf[N(C2H5)2]4$), hafnium tert-butoxide ($Hf[OC(CH_3)_3]_4$), $Hf[OC(CH3)2CH2OCH3]4$, and the like, These may be used alone or in a combination thereof.

The source gas may be formed by forming a liquid metal precursor into an aerosol mist using an atomizer and then vaporizing the aerosol mist using a vaporizer. Alternatively, the source gas may be formed by bubbling of a carrier gas into a liquid metal precursor.

The metal precursor layer may be formed while the source gas flows along the surface of the semiconductor substrate 10. The metal precursor layer may be an atomic layer chemisorbed on the surface of the semiconductor substrate 10. Further, the metal precursor may be physisorbed on the chemisorbed metal precursor layer, so that a second layer including the physisorbed metal precursor may be formed.

In step S300, a purge gas may be supplied into the interior of the process chamber 300. The purge gas may be supplied from the third gas supply section 430 into the process chamber 300 through the first and second channels 360 and 362 and the gas inlet port 302. The second layer may be removed from the chemisorbed metal precursor layer by the supply of the purge gas and vacuum evacuation of process chamber 300. Further, the source gas remaining in the process chamber 300 may be also removed from the process chamber 300 along with the purge gas by the vacuum evacuation.

In step S400, an oxidizing gas including ozone may be supplied into the process chamber 300 to oxidize the metal precursor layer. The oxidizing gas may be supplied to flow along a surface of the metal precursor layer from the second gas supply section 420 through the second channel 362 and the gas inlet port 302.

In step S500, a RF power may be applied to accelerate an oxidation reaction between the metal precursor layer and the oxidizing gas. The RF power may be applied to the oxidizing gas flowing along the surface of the metal precursor layer by the RF electrode 350, which is connected to the RE power source 900. A concentration of oxygen radical in the oxidizing gas may be increased by applying the RF power, and the oxidation reaction between the metal precursor layer and the oxidizing gas may be then accelerated.

As a result, a metal oxide layer having improved electrical characteristics may be formed on the semiconductor substrate 10. Particularly, in case cylindrical lower electrodes having a high aspect ratio are formed on a semiconductor substrates the method of forming metal oxide in accordance with the embodiments of the present invention may be desirably employed.

Though sequentially performed in FIG. 7, the steps S400 and S500 may be performed at the same time.

Further, step S350 may be performed prior to step S400. In step S350, an oxygen gas may be supplied into the process chamber 300 to remove the purge gas from the process chamber 300 and to form an oxygen atmosphere in the process chamber 300. For example, the oxygen gas may be supplied from the fourth gas supply section 440 through the second channel 362 and the gas inlet port 302 for about 0.1 to about 3 seconds.

In step S600, a purge gas may be supplied into the process chamber 300. The purge gas may be supplied from the third gas supply section 430 through the first and second channels 360 and 362 and the gas inlet port 302 into the process chamber 300. The oxidizing gas and by-products remaining in the process chamber may be removed along with the purge gas from the process chamber 300 through the outlet port 304 and the third channel 366.

While performing the steps S200 through S600, the semiconductor substrate 10 may be heated to a predetermined process temperature by the heater 230. For example the semiconductor substrate 10 may be maintained at a process temperature in a range of room temperature to about 450° C. Furthers the interior of the process chamber 300 may be maintained at a pressure in a range of about 0.1 to about 10 Torr while performing the steps S200 through S600. For example, the interior of the process chamber 300 may be maintained at a pressure of about 3 Torr by a pressure adjusting gas supplied from the third gas supply section 430 and the operation of exhauster 500.

In step S700, the semiconductor substrate 10 may be rotated by a predetermined angle. For example, the semiconductor substrate 10 may be rotated by the first driving section 700 by about 60°, 90°, 180°, etc.

In step S800, the steps S200 through S600 may be repeatedly performed. The steps S700 and S800 may be repeatedly performed to form a metal oxide layer having a desired thickness on the semiconductor substrate 10. As a result, a metal oxide layer having improved electrical characteristics and thickness uniformity may be formed on the semiconductor substrate 10.

In accordance with another example embodiment of the present invention, the semiconductor substrate 10 may be continuously rotated while repeatedly performing the steps S200 through S600 at a predetermined speed.

Experiments were performed to inspect electrical characteristics of metal oxide layers formed by conventional methods of forming metal oxide and methods of forming metal oxide in accordance with example embodiments of the present invention.

COMPARATIVE EXAMPLE 1

A first hafnium oxide layer was formed on a semiconductor substrate having cylindrical lower electrodes by a conventional PEALD process using oxygen plasma. Particularly, a process temperature was maintained at about 300° C., and a pressure in a process chamber was maintained at about 3 Torr while forming the first hafnium oxide layer. Leakage currents through the first hafnium oxide layer were measured at a left portion, a central portion and a right portion of the semiconductor substrate. Measured results were shown in FIG. 8.

COMPARATIVE EXAMPLE 2

A second hafnium oxide layer was formed on a semiconductor substrate having cylindrical lower electrodes by a convention ALD process using an oxidizing gas including ozone. Particularly, a process temperature was maintained at about 300° C., and a pressure in a process chamber was maintained at about 3 Torr while forming the second hafnium oxide layer. Leakage currents through the second hafnium oxide layer were measured at a left portion, a central portion and a right portion of the semiconductor substrate. Measured results were shown in FIG. 9.

An equivalent oxide thickness (EOT) of a central portion of the first hafnium oxide layer was approximately 20.1 Å. EOTs of a left portion and a right portion of the first hafnium oxide layer were approximately 19.1 Å and approximately 19.6 Å respectively.

An EOT of a central portion of the second hafnium oxide layer was approximately 29.8 Å. EOTs of a left portion and a right portion of the second hafnium oxide layer were approximately 28.7 Å and approximately 28.6 Å, respectively.

Figure 8:
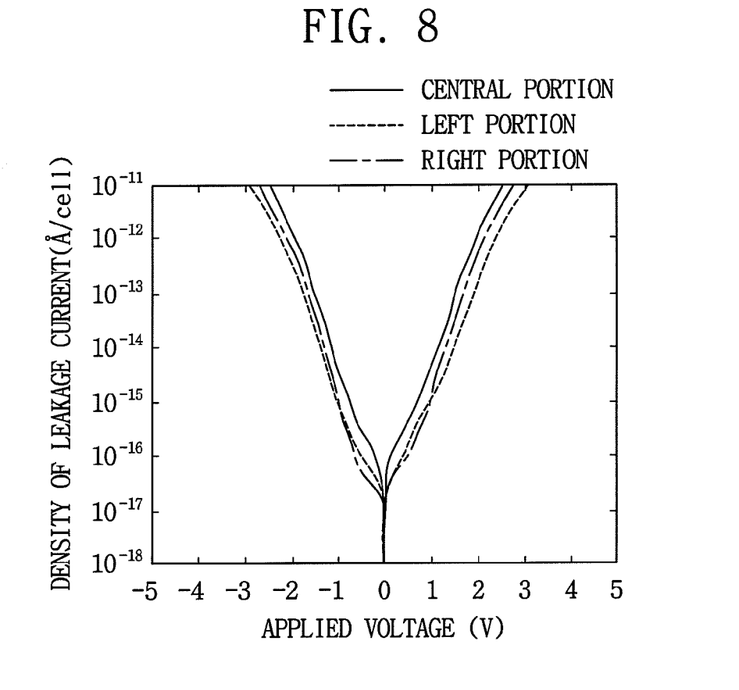
FIGS. 8 and 9 are graphs showing leakage current characteristics of metal oxide layers formed by a conventional method of forming metal oxide.
Figure 9:
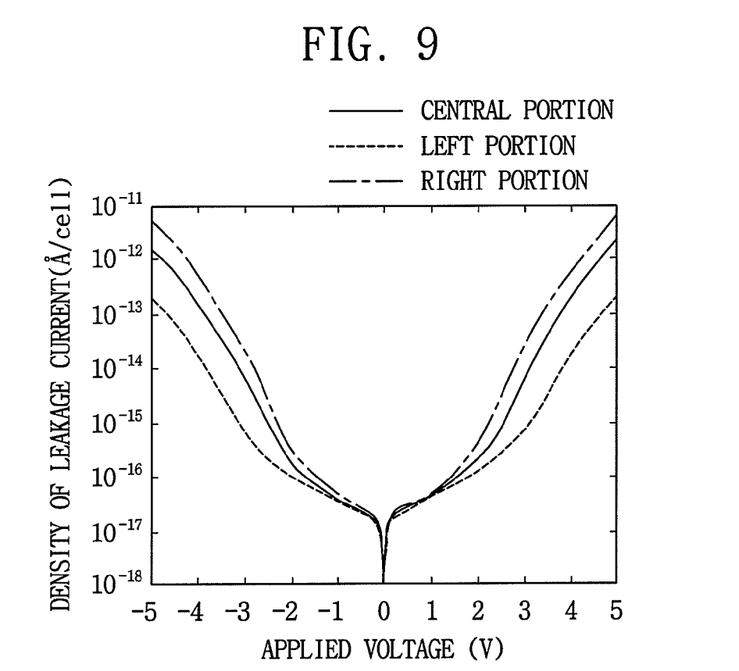

Referring to FIGS. 8 and 9, leakage current characteristics of the first hafnium oxide layer were poor in comparison with those of the second hafnium oxide layer. However, distribution of leakage current of the second hafnium oxide layer was poor in comparison with that of the first hafnium oxide layer.

EXAMPLE 1

A third hafnium oxide layer was formed on a semiconductor substrate having cylindrical lower electrodes by a method of forming metal oxide in accordance with an embodiment of the present invention.

An oxidizing gas having an ozone concentration of approximately 200 g/m$^3$ was used for forming the third hafnium oxide layer, and a RF power of approximately 250 W was applied by the RF electrode 350. Further, a temperature of the semiconductor substrate was maintained at approximately 300° C., and a pressure in the process chamber 300 was maintained at approximately 3 Torr.

Leakage currents through the third hafnium oxide layer were measured at a left portion a central portion and a right portion of the semiconductor substrate. Measured results were shown in FIG. 10.

An EOT of a central portion of the third hafnium oxide layer was approximately 19.5 Å. EOTs of a left portion and a right portion of the third hafnium oxide layer were approximately 20.1 Å and approximately 19.5 Å, respectively.

Figure 10:
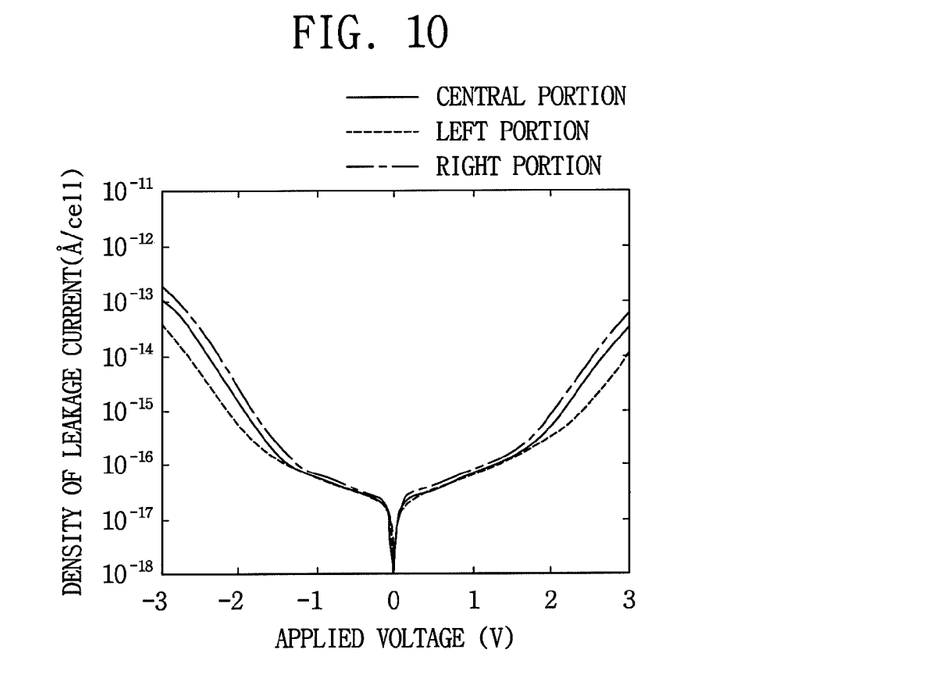
FIG. 10 is a graph showing leakage current characteristics of a metal oxide layer formed by a method of forming metal oxide in accordance with an exemplary embodiment of the present invention.

Referring to FIG. 10, It is understood that the EOTs of the third hafnium oxide layer are similar to those of the first hafnium oxide layer and leakage current characteristics of the third hafnium oxide layer are improved in comparison with those of the first hafnium oxide layer.

It is difficult to directly compare the third hafnium oxide layer with the second hafnium oxide layer, because the EOTs of the second hafnium oxide layer are thicker than those of the third hafnium oxide layer. However, it is understood that distribution of leakage current of the third hafnium oxide layer is improved in comparison with that of the second hafnium oxide layer as shown in FIG. 10.

To directly compare the first, second and third hafnium oxide layers, variations of leakage current according to variations of electrical field (applied voltage/EOT) were measured. Measured results were shown in FIG. 11.

Figure 11:
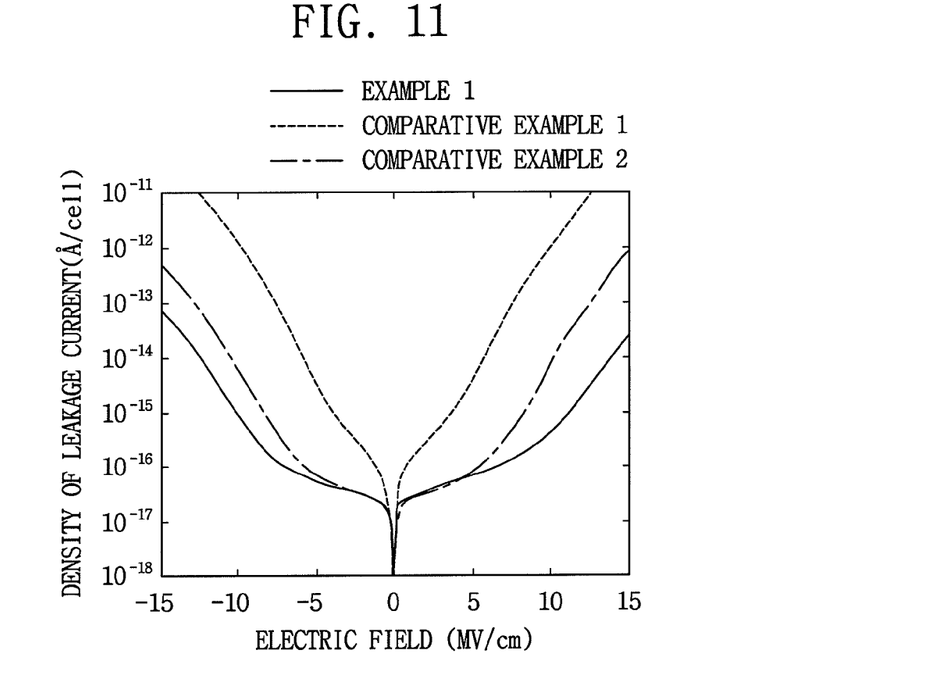
FIG. 11 is a graph showing leakage current characteristics of hafnium oxide layers formed by a conventional method of forming metal oxide and a hafnium oxide layer formed by a method of forming metal oxide in accordance with an exemplary embodiment of the present invention.

Referring to FIG. 11 it is understood that the leakage current characteristics of the third hafnium oxide layer are improved in comparison with those of the second hafnium oxide layer.

EXAMPLE 2

A fourth hafnium oxide layer was formed on a semiconductor substrate having cylindrical lower electrodes by a method of forming metal oxide in accordance with an embodiment of the present invention.

A RF power of approximately 100 W was applied by the RF electrode 350, and an oxidizing gas including ozone was supplied at a flow rate of approximately 100 sccm. Further, a temperature of the semiconductor substrate was maintained at approximately 300° C. and a pressure in the process chamber 300 was maintained at approximately 3 Torr.

EXAMPLE 3

A fifth hafnium oxide layer was formed on a semiconductor substrate having cylindrical lower electrodes by a method of forming metal oxide in accordance with still another embodiment of the present invention.

A RF power of approximately 100 W was applied by the RF electrode 350, and an oxidizing gas including ozone was supplied at a flow rate of approximately 500 sccm. Further, a temperature of the semiconductor substrate was maintained at approximately 300° C., and a pressure in the process chamber 300 was maintained at approximately 3 Torr.

EXAMPLE 4

A sixth hafnium oxide layer was formed on a semiconductor substrate having cylindrical lower electrodes by a method of forming metal oxide in accordance with stilt another embodiment of the present invention.

A RF power of approximately 250 W was applied by the RF electrode 350, and an oxidizing gas including ozone was supplied at a flow rate of approximately 100 sccm. Further, a temperature of the semiconductor substrate was maintained at approximately 300° C., and a pressure in the process chamber 300 was maintained at approximately 3 Torr.

EXAMPLE 5

A seventh hafnium oxide layer was formed on a semiconductor substrate having cylindrical lower electrodes by a method of forming metal oxide in accordance with still another embodiment of the present invention.

A RF power of approximately 250 W was applied by the RF electrode 350, and an oxidizing gas including ozone was supplied at a flow rate of approximately 500 sccm. Further, a temperature of the semiconductor substrate was maintained at approximately 300° C., and a pressure in the process chamber 300 was maintained at approximately 3 Torr.

Figure 12:
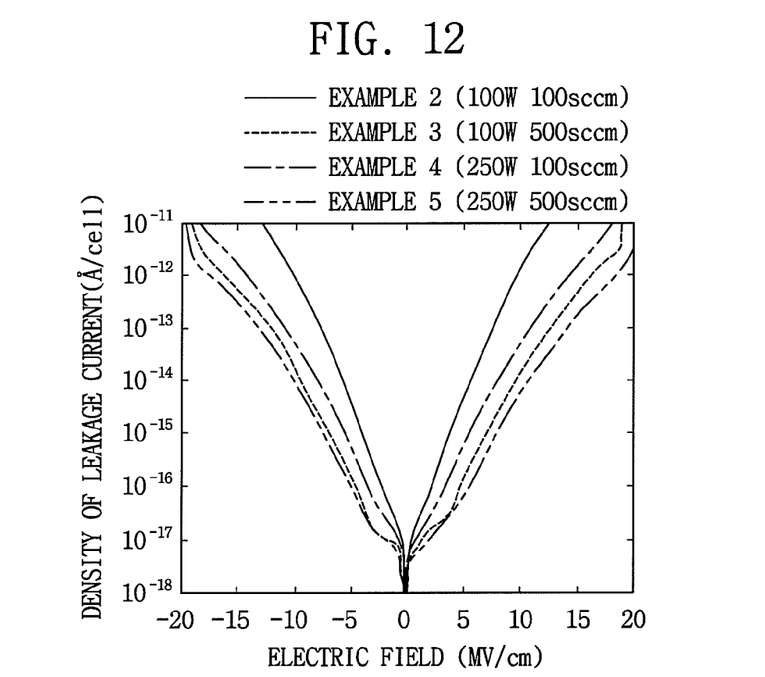
FIG. 12 is a graph showing leakage current characteristics of hafnium oxide layers formed by methods of forming metal oxide in accordance with exemplary embodiments of the present invention.

Leakage currents through the fourth, fifth, sixth and seventh hafnium oxide layers were measured, and measured results were shown in FIG. 12.

EOTs of the fourth, fifth, sixth and seventh hafnium oxide layers were approximately 17.5 Å, approximately 16.0 Å, approximately 15.2 Å, approximately 15.9 Å, respectively. As shown in FIG. 12, it is understood that leakage current characteristics are improved as both the applied RF power and the flow rate of the oxidizing gas are increased.

As a result, it is understood that a metal oxide layer having desired leakage current characteristics may be formed by adjusting the RF power in a range of about 100 to about 300 W and adjusting the flow rate in a range of about 100 to about 1000 sccm.

EXAMPLE 6

A zirconium oxide layer was formed on a semiconductor substrate having cylindrical lower electrodes which is formed in accordance with a design rule of about 70 nm by a method of forming metal oxide in accordance with another embodiment of the present invention.

A RF power of approximately 250 W was applied by the RF electrode 350, and an oxidizing gas including ozone was supplied at a flow rate of approximately 500 sccm while forming the zirconium oxide layer. Furthers a temperature of the semiconductor substrate was maintained at approximately 300° C., and a pressure in the process chamber 300 was maintained at approximately 3 Torr.

Figure 13:
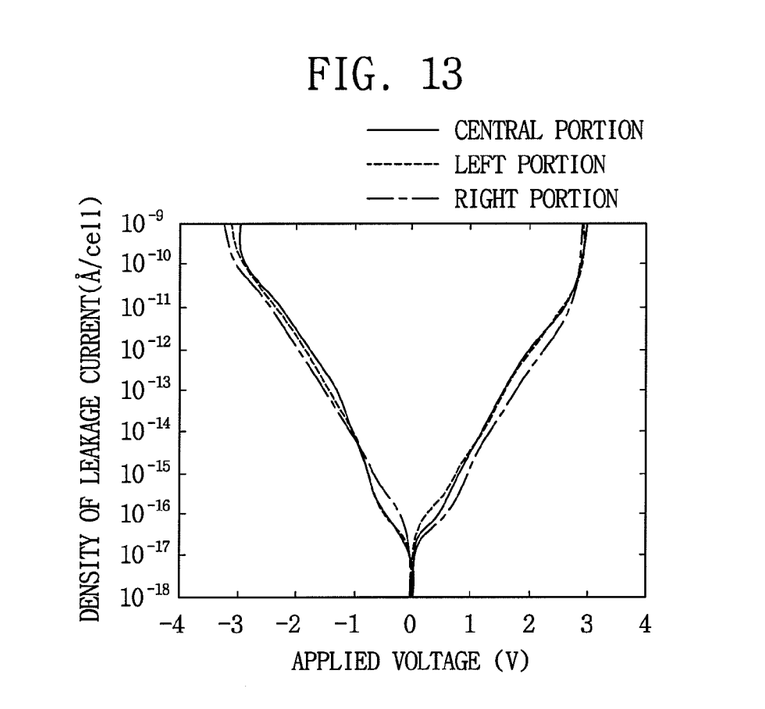
FIG. 13 is a graph showing leakage current characteristics of a zirconium oxide layer formed by a method of forming metal oxide in accordance with an exemplary embodiment of the present invention.

Leakage currents through the zirconium oxide layer were measured at a central portion, a left portion and a right portion of the semiconductor substrate, and measured results were shown in FIG. 13.

EOTs at the central, left and right portions of the zirconium oxide layer were approximately 8.4 Å, approximately 8.4 Å and approximately 7.9 Å, respectively. As shown in FIG. 13, it is understood that leakage current characteristics and distribution of leakage current are improved when the applied voltage is in a range of about ±1V.

In accordance with exemplary embodiments of the present invention, an oxidation reaction between a metal precursor layer on a semiconductor substrate and an oxidizing gas may be accelerated by applying a RF power to the oxidizing gas. As a result, a metal oxide layer formed by the accelerated oxidation reaction may have improved electrical characteristics and thickness uniformity.

Although exemplary embodiments of the present invention have been described, it is understood that other embodiments of the present invention should not be limited to these exemplary embodiments but various changes and modifications can be made by those skilled in the art within the spirit and scope as hereinafter claimed.

What is claimed is:

1. A method of forming a metal oxide comprising:
   i) supplying a source gas including a metal precursor to allow the source gas to flow along a surface of a substrate so that a metal precursor layer is formed on the substrate;
   ii) supplying an oxygen gas onto the substrate to form an oxygen atmosphere on the substrate;
   iii) supplying an oxidizing gas including ozone to allow the oxidizing gas to flow along a surface of the metal precursor layer to oxidize the metal precursor layer so that metal oxide is formed on the substrate; and
   iv) applying a radio frequency power to the oxidizing gas flowing along the surface of the metal precursor layer to accelerate a reaction between the metal precursor layer and the oxidizing gas.

2. The method of claim 1, wherein the metal precursor comprises at least one selected from the group consisting of zirconium (Zr), hafnium (Hf), aluminum (Al), tantalum (Ta), titanium (Ti), lanthanum (La), strontium (Sr), barium (Ba), praseodymium (Pr) and lead (Pb).

3. The method of claim 1, wherein a concentration of the ozone in the oxidizing gas is in a range of about 100 $g/m^3$ to about 1000 $g/m^3$.

4. The method of claim 1, wherein the radio frequency power is applied substantially simultaneously with the supply of the oxidizing gas.

5. The method of claim 1, wherein the oxygen gas is supplied for about 0.1 to about 3 seconds.

6. The method of claim 1, further comprising:
   purging an interior of a process chamber in which the substrate is placed after forming the metal precursor layer; and
   purging the interior of the process chamber after forming the metal oxide.

7. The method of claim 1, wherein the source gas and the oxidizing gas flow from a first edge portion of the substrate towards a second edge portion opposite to the first edge portion of the substrate.

8. The method of claim 1, wherein an interior of a process chamber in which the substrate is placed is maintained at a pressure in a range of about 0.1 to about 10 Torr, and the substrate is maintained at a temperature in a range of room temperature to about 450° C.

9. The method of claim 1, further comprising:
   v) rotating the substrate by a predetermined angle; and
   vi) repeatedly performing i) through iv).

10. The method of claim 1, further comprising:
    v) repeatedly performing i) through iv) while continuously rotating the substrate.

* * * * *